United States Patent
Oka

Patent Number: 5,769,350
Date of Patent: Jun. 23, 1998

[54] PAPER MAGAZINE

[75] Inventor: Teruhito Oka, Wakayama, Japan

[73] Assignee: Noritsu Koki Co., Ltd., Wakayama, Japan

[21] Appl. No.: 761,078

[22] Filed: Dec. 17, 1996

[30]  Foreign Application Priority Data

Dec. 19, 1995  [JP]  Japan ................................. 7-330225

[51] Int. Cl.⁶ .......................... B65H 16/02; B65H 23/04
[52] U.S. Cl. ................ 242/422.4; 242/348; 242/564.4; 242/546; 242/599.3; 242/599.4; 242/598.3
[58] Field of Search ................................ 242/348, 348.4, 242/416, 422.4, 423, 423.1, 564.4, 588.5, 588.6, 598.3, 598.6, 599.3, 599.4, 546, 550

[56]  References Cited

U.S. PATENT DOCUMENTS

| | | | |
|---|---|---|---|
| 3,044,724 | 7/1962 | Goodwin | 242/422.4 |
| 3,531,057 | 9/1970 | Way | 242/423.1 |
| 3,777,999 | 12/1973 | Sciola et al. | 242/599.3 |
| 3,974,974 | 8/1976 | Nishikawa | 242/422.4 |
| 4,218,123 | 8/1980 | Viehrig et al. | 242/348.4 |
| 4,842,215 | 6/1989 | Takami | 242/422.4 |
| 4,854,519 | 8/1989 | Maeda et al. | 242/422.4 |
| 4,915,319 | 4/1990 | Gerber | 242/423.1 |

FOREIGN PATENT DOCUMENTS

| | | |
|---|---|---|
| 0 198 124 | 10/1986 | European Pat. Off. . |
| 4-335345 | 11/1992 | Japan . |

*Primary Examiner*—John M. Jillions
*Attorney, Agent, or Firm*—Wenderoth, Lind & Ponack

[57] ABSTRACT

A paper magazine made up of a small number of parts and capable of rewinding paper pulled out of the case around the roll of paper in the magazine by turning the paper roll. The paper roll is supported on a roll support shaft provided in the magazine case. The roll support shaft includes a core support rod, a pair of cylindrical end members mounted on both ends of the core support rod, and a core mounted on the core support rod between the end members. The paper roll is mounted on the core. When the paper is pulled out of the paper roll, the core is rotated in one direction, so that one of two torsion coil springs tightens to bias the core in the paper rewinding direction. Thus, as soon as the paper is pulled back into the case, the core is turned in the rewinding direction by the one of the coil springs, so that the paper can be smoothly wound around the core.

4 Claims, 4 Drawing Sheets

PAPER MAGAZINE

BACKGROUND OF THE INVENTION

This invention relates to a paper magazine for storing a roll of paper such as printing paper.

A printing/developing machine has an exposure unit for printing images on negative film onto printing paper and a developing unit for developing the printed paper. A paper magazine in which is mounted a roll of printing paper is set in the printing/developing machine to feed the paper from the paper magazine into the exposure unit and then into the developing unit.

If the print size is changed, the paper magazine is replaced with a new one containing a paper roll of the right size.

To replace the paper magazine, the paper is cut by a cutter provided along a paper feed path in the printing/developing machine and pulled back into the magazine case.

Heretofore, in order to replace the paper magazine, paper was pulled back into the paper magazine by reversing advance rollers provided in the paper feed path or driving rollers provided at the paper outlet in the magazine case, or by rotating the paper roll itself in a reverse direction.

When the printing paper is pulled back into the magazine case by rotating the advance roller and the driving rollers, the paper is stuffed into the magazine case, so that it is very frequently bent or otherwise damaged in the case to such an extent that it cannot be used for printing any more.

When the paper is pulled back into the case by rotating the paper roll itself, the paper roll is rotated by an electric drive means which consists of a large number of parts and is complicated in structure and costly, so that the entire magazine is heavy and difficult to handle.

An object of this invention is to provide an inexpensive, lightweight and easy-to-handle paper magazine having an extremely simple rewinding means for rotating the paper roll in the paper rewinding direction.

SUMMARY OF THE INVENTION

According to this invention, there is provided a paper magazine comprising a magazine case having side plates for containing a roll of paper, and a roll support shaft provided in the magazine case for supporting the roll of paper, the magazine case having a paper outlet through which the paper from the roll of paper supported on the roll support shaft is pulled out, the roll support shaft comprising a core support rod, a pair of cylindrical end members nonrotatably supported on both ends of the core support rod by the side plates of the magazine case, a core rotatably supported on the core support rod between the end members for supporting the paper roll, a torsion coil spring mounted so as to be torqued and tightened when the core is rotated in one of two opposite directions, and a rotation angle restricting means for stopping the rotation of the core when the core has rotated by a predetermined angle in either direction.

In operation, when the paper is pulled out of magazine case with the paper roll set on the core, the core, which is in frictional contact with the paper roll, is rotated with the paper roll, so that the torsion coil spring is torqued and tightens to bias the core in the paper rewinding direction. The core is thus turned in the paper rewinding direction by the coil spring as soon as the paper is fed back into the paper magazine, so that the paper can be smoothly wound around the paper roll.

Other features and objects of the present invention will become apparent from the following description made with reference to the accompanying drawings, in which:

DETAILED DESCRIPTION OF THE PREFERRED EMBODIMENT

The embodiment of this invention will now be described with reference to the drawings.

Figure 1:
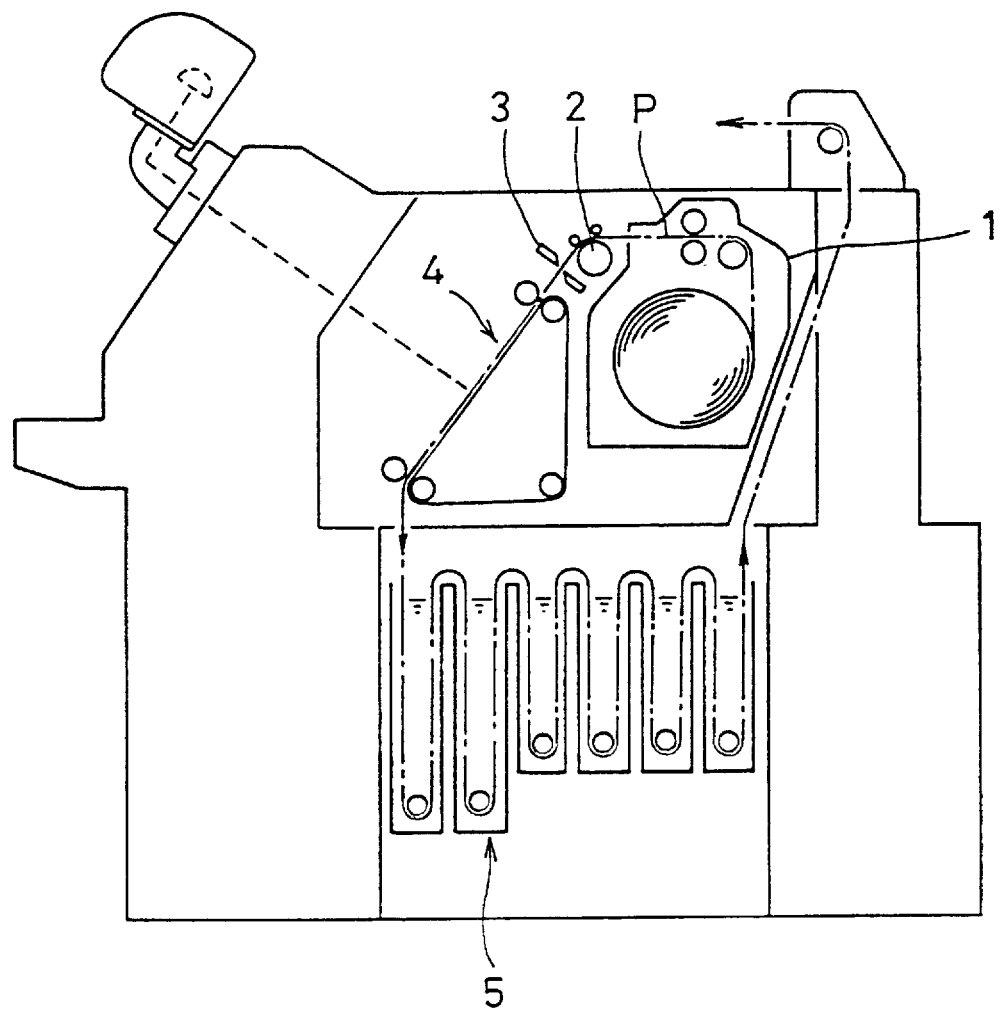
FIG. 1 is a schematic view of a printing/developing machine provided with the paper magazine according to this invention.

FIG. 1 schematically shows the printing/developing machine. Printing paper P that has been pulled out of a paper magazine 1 is fed through a paper feed path along which are provided an advance roller 2 and a cutter 3 downstream. The printing paper P is pulled out of the paper magazine 1 and fed into an exposure unit 4 by rotating the advance roller 2. The paper printed in the exposure unit 4 is then fed into the developing unit 5 and developed.

Figure 2:
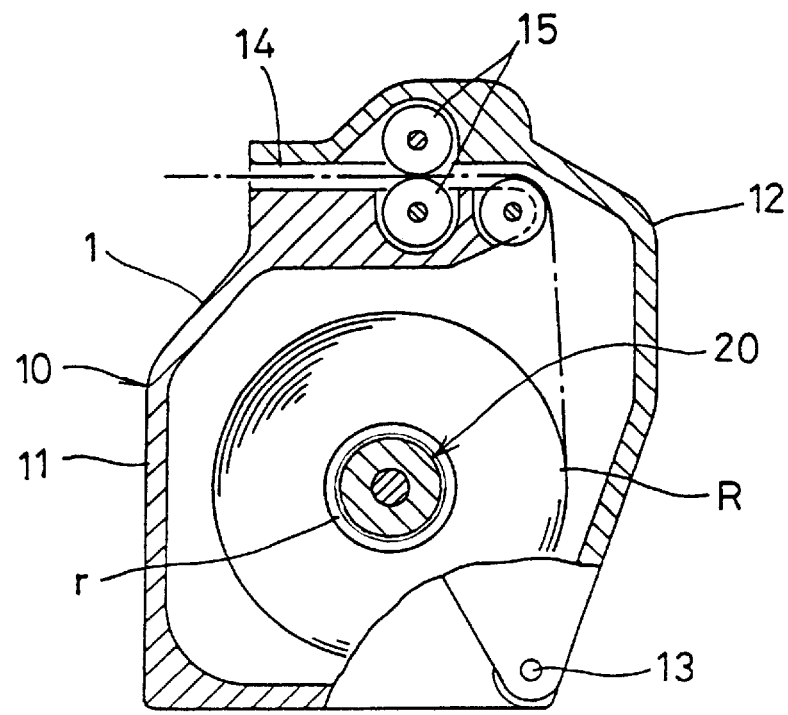
FIG. 2 is a vertical sectional side view of the paper magazine of FIG. 1.

FIG. 2 shows the paper magazine 1. It has a magazine case 10 in which is mounted a roll R of printing paper P.

The magazine case 10 comprises a front case member 11 and a rear case member 12 coupled together by a hinge 13 that allows the members 11 and 12 to pivot between an open and a closed position. When in the closed position, the members 11 and 12 define a paper outlet 14 therebetween at the upper front portion of the case 10.

A pair of vertically arranged driving rollers 15 are provided at the paper outlet.

The paper roll R is detachably mounted on a roll support shaft 20 provided in the magazine case 10.

FIGS. 3 through 6 show the roll support shaft 20. It has a core support rod 21 on which are supported a pair of cylindrical end members 22 and a cylindrical core 23 provided between the end members 22.

The end members 22 are nonrotatable relative to the core support rod 21 and have a polygonal outer surface. Each end member 22 has a flange 24 at the outer end thereof. It has its outer end detachably received in a bearing hole 16 formed in a side plate 11a of the front case member 11 and a side plate 12a of the rear case member 12 at a portion where the side plates 11a and 12a abut each other. With the end members 22 received in the respective holes 16, they are nonrotatably held between the side plates 11a and 12a of the front and rear case members 11 and 12.

The core 23 is rotatably supported on the core support rod 21 through a pair of bearings 25. The core 23 has an outer diameter greater than the outer diameter of the end members 22. The paper roll R is detachably mounted on the core 23.

The paper roll R has a core r. With the paper roll R mounted on the core 23, the inner periphery of the core r is brought into frictional contact with the outer periphery of the core 23. Thus, when the paper roll R is rotated by pulling out the paper P, the core 23 is also frictionally rotated if it can rotate at all. If the core 23 is stopped from rotating, the core r of the paper roll will slip on the core 23.

A pair of torsion coil springs 26 and 27 are mounted on the core support rod 21, facing the inner ends of the end members 22. Each of the coil springs 26 and 27 has its one end in engagement with a spring support 28 provided on the inner surface of each end member 22 and the other end in engagement with a pin 29 provided at either end of the core 23.

One of the pair of torsion coil springs 26, 27 is mounted so that it tightens when the core 23 rotates in one direction, while the other tightens when the core 23 rotates in the other direction.

When the core 23 rotates a predetermined angle in either direction, its rotation is stopped by a rotation angle restricting means 30.

Figure 3:
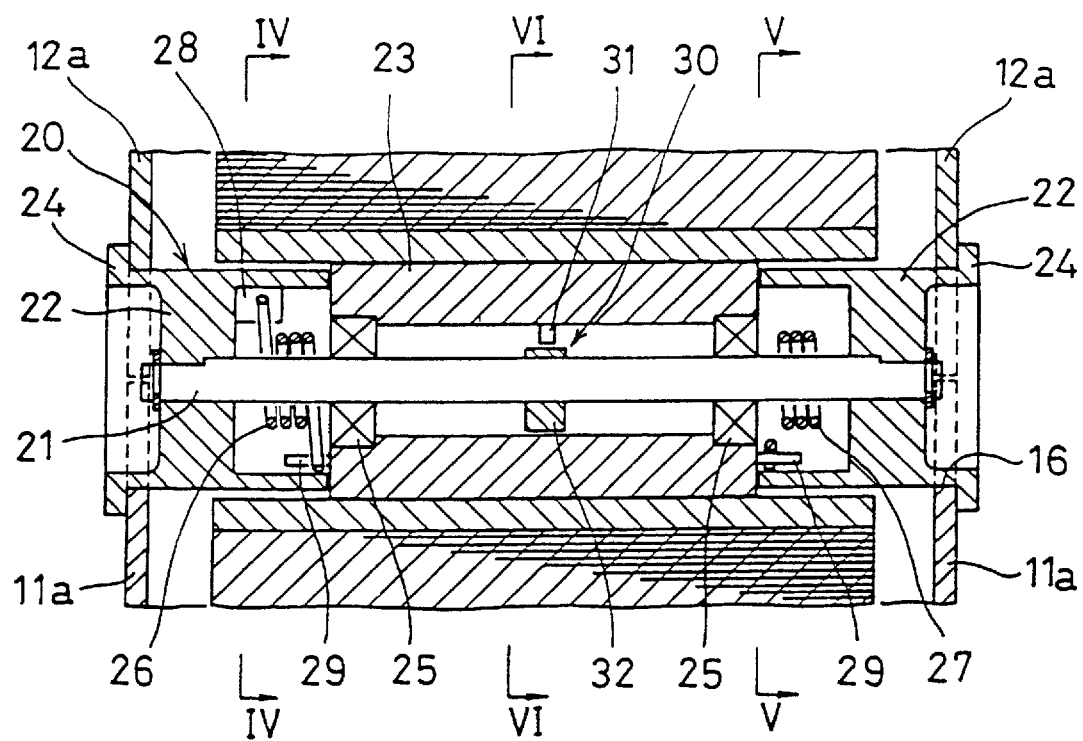
FIG. 3 is a sectional view of the roll support shaft of the paper magazine of FIG. 2.
Figure 4:
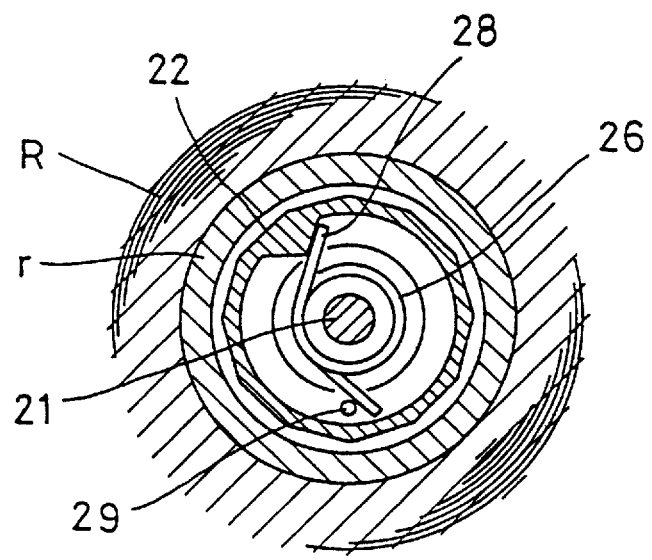
FIG. 4 is a sectional view taken along line IV—IV of FIG. 3.
Figure 5:
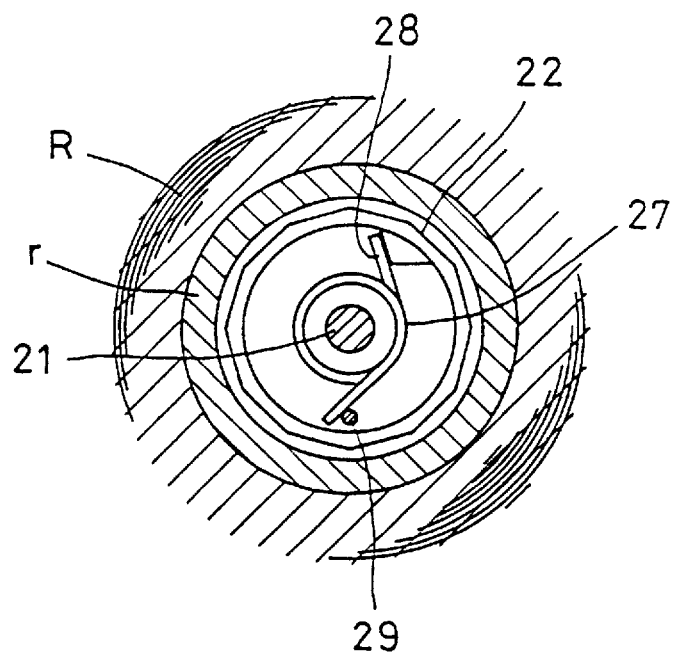
FIG. 5 is a sectional view taken along line V—V of FIG. 3.
Figure 6:
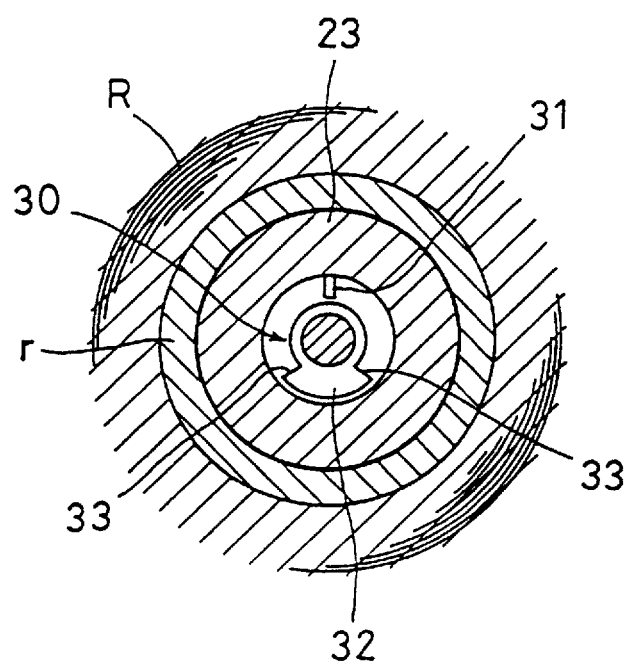
FIG. 6 is a sectional view taken along line VI—VI of FIG. 3.

The means 30 comprises, as shown in FIGS. 3 and 6, a stopper pin 31 provided on the inner surface of the core 23 and a stopper ring 32 provided on the core support rod 21 opposite the stopper pin 31. The stopper ring 32 has two stopper surfaces 33 on its outer periphery. When the core 23 rotates by a predetermined angle in either direction, the stopper pin 31 abuts one of the stopper surfaces 33, preventing any further rotation of the core 23.

In operation, the paper roll R is mounted on the core 23 of the roll support shaft 20 and set in the magazine case 10. The paper P is then pulled out of the case 10 through the paper outlet 14 and fed into the paper feed path until it comes into contact with the advance roller 2. In this state, the advance roller 2 and the driving rollers 15 are activated to feed the printing paper P into the exposure unit 4 shown in FIG. 1. As the paper is pulled out, the paper roll R rotates.

Since the core r of the paper roll R is in frictional contact with the core 23, the core 23 is rotated by the rotating paper roll R. As the core 23 rotates, one of the torsion coil springs 26 and 27 is torqued and tightens.

When the core 23 rotates by a predetermined angle, the stopper pin 31 shown in FIG. 6 abuts one of the stopper surfaces 33, stopping any further rotation of the core 23. When the paper P is further pulled out, the paper roll R rotates with its core r slipping on the on the core 23. The one of the torsion coil springs 26, 27 remains tightened all the while.

When the paper P is cut by the cutter 3 shown in FIG. 1 and pulled back by reversing the advance roller 2 and the driving rollers 15 after the paper has been printed or in order to replace the paper magazine 1, the core 23 is rotated in the direction to wind the paper, biased by the one of the torsion coil springs 26 and 27. The paper is thus pulled back into the magazine case 10 and wound around the roll R, with no possibility of damage to the paper.

Ordinarily, the paper roll R and the roll support shaft 20 are combined in a darkroom. Thus, the roll support shaft 20 may be inserted into the core of the paper roll R with either end first. If the shaft 20 had only one torsion coil spring, the single torsion coil spring would not be torqued and tightened even when the paper is pulled out and the core 23 is rotated with the paper roll R if the shaft 20 is inserted in the wrong way by mistake.

According to the present invention, two torsion coil springs 26 and 27 are used. They are mounted so that one of them tightens when the core 23 rotates in one direction, while the other tightens when the core 23 rotates in the other direction. Thus, one of the springs 26 and 27 tightens whenever the paper is pulled out, irrespective of in which direction the shaft 20 is inserted into the roll R.

According to this invention, when the paper is pulled out of the paper roll set on the core of the roll support shaft, the core, which is in frictional contact with the paper roll, is rotated with the roll, so that the torsion coil spring tightens. Thus, when the paper is pulled back into the paper magazine, the core is turned in the paper rewinding direction by the coil spring, so that the paper can be smoothly wound around the paper roll with no possibility of damage to the paper.

The paper rewinding mechanism according to the invention, consisting of one or two torsion coil springs, is extremely simple in structure, easy to assemble and very cheap. Thus, it is possible to use a very compact and lightweight magazine case. The paper magazine having such a paper rewinding mechanism is easy to handle.

The rotation angle restricting means improves the durability of the torsion coil spring by preventing it from being torqued excessively.

By providing two torsion coil springs so that one tightens when the core is rotated in one direction and the other tightens when the core is rotated in the other direction, the core is turned in the paper rewinding direction whenever the paper is pulled back into the paper magazine irrespective of the direction in which the core support shaft is inserted in the paper roll.

What is claimed is:

1. A paper magazine comprising a magazine case having side plates for containing a roll of paper, and a roll support shaft provided on said magazine case for supporting the roll of paper, said magazine case having a paper outlet through which the paper from the roll of paper supported on said roll support shaft is pulled out, said roll support shaft comprising a core support rod, a pair of cylindrical end members nonrotatably supported on both ends of said core support rod by said side plates of said magazine case, a core rotatably supported on said core support rod between said end members for supporting the paper roll, a torsion coil spring mounted so as to be torqued and tightened when said core is rotated in one of two opposite directions, and a rotation angle restricting means for stopping the rotation of said core when said core has rotated by a predetermined angle in either direction.

2. A paper magazine as claimed in claim 1 further comprising a second torsion coil spring mounted so as to be torqued and tightened when said core is rotated in the other of said two opposite directions.

3. A paper magazine as claimed in claim 1 wherein said rotation angle restricting means comprises a stopper pin provided on the inner periphery of said core and a stopper ring provided on said core support rod at a position opposite to said stopper pin and having stopper surfaces formed on the outer periphery thereof so as to engage said stopper pin.

4. A paper magazine as claimed in claim 2 wherein said rotation angle restricting means comprises a stopper pin provided on the inner periphery of said core and a stopper ring provided on said core support rod at a position opposite to said stopper pin and having stopper surfaces formed on the outer periphery thereof so as to engage said stopper pin.

* * * * *